Patented June 29, 1926.

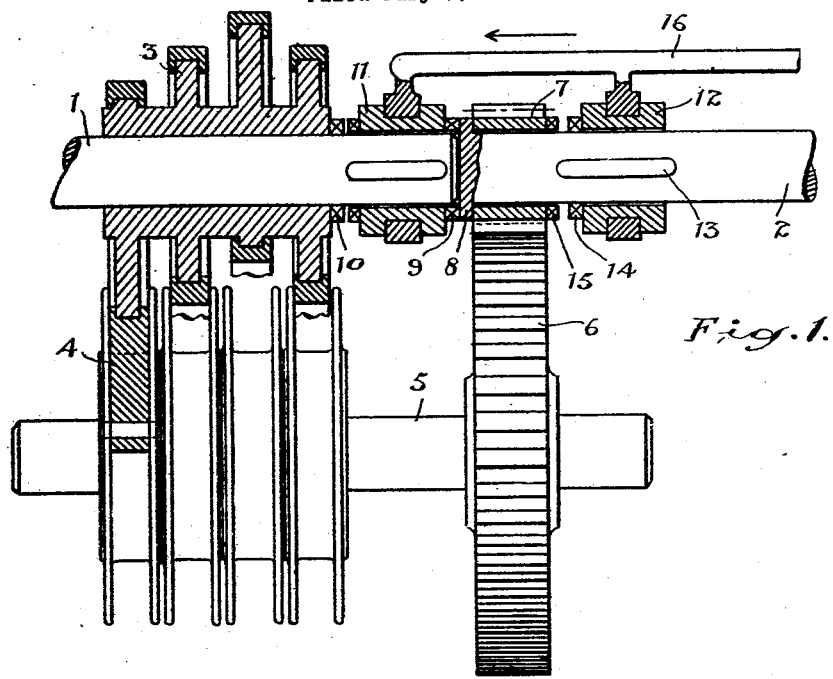

1,590,427

UNITED STATES PATENT OFFICE.

DIMITRI SENSAUD DE LAVAUD, OF PARIS, FRANCE.

SPEED-CHANGE MECHANISM.

Application filed July 7, 1924, Serial No. 724,611, and in France December 15, 1923.

The principal object of this invention is to arrange a simple means of gear connection where a driven shaft is operated through a variable speed mechanism operating through a free wheel so that the general functioning of the free wheel drive may be eliminated for any desirable reason.

The principal feature of the invention consists in the novel arrangement of a pair of clutch members mounted upon separate shafts and co-operating with a positive gear train and a free wheel driving mechanism to selectively connect either of said drives.

In the drawing, Figure 1 is a part sectional diagrammatic view showing the driving and driven shafts arranged in direct alignment and having a selective arrangement of a free wheel or direct drive.

Figure 2 is a view similar to Figure 1 with the gear trains arranged between the drive shaft and the intermediary shaft.

In the construction illustrated in Figure 1 the drive shaft 1 is shown arranged in alignment with the driven shafts 2, the ends of said shaft abutting.

On the shaft 1 is secured an arrangement of eccentrics 3 diagrammatically shown, which co-operate with the free wheel clutch members 4 arranged upon an intermediate shaft 5.

Upon the shaft 5 is secured a spur gear 6 which meshes with a pinion 7 which is loosely mounted on the driven shaft 2.

The driven shaft 2 is formed with a flange 8 having a plurality of clutch teeth 9 and a corresponding set of clutch teeth 10 are arranged on the adjacent end of the eccentrics 3.

A clutch sleeve 11 having clutch teeth on both ends is slidably mounted on the drive shaft between the eccentrics 3 and the toothed flange 8. This sleeve is slidably arranged on a longitudinal key-way and is therefore turned with the driving shaft and is adapted to be moved to engage the teeth of the eccentrics or to engage the teeth of the driven shaft, said sleeve being so constructed as to disengage from the one upon engagement with the other.

The clutch sleeve 12 is slidably mounted on the driven shaft 2, being held from rotation by the key 13.

The sleeve 12 is provided with clutch teeth 14 adapted to interlock with the clutch teeth 15 on the spur pinion 7.

The sleeves 11 and 12 are connected to be operated in unison so that when the sleeve 11 is moved into operative engagement with the eccentrics 3 the sleeve 12 will move into engagement with the pinion 7 and the drive shaft operating the sleeve 11 drives the eccentrics and the eccentrics operating through the clutches 4 rotate the spur wheel 6 and drive the pinion 7 and the sleeve 12 being interlocked with the pinion drives the driven shaft.

When the clutches are reversed the sleeve 11 is moved into direct engagement with the driven shaft and it is therefore disconnected from the eccentrics 3. The sleeve 12 is at the same time disconnected from the pinion 7.

Any suitable form of device may be arranged for operating these clutch sleeves. A simple fork rod 16 is here shown.

In the form shown in Figure 2 the driven shaft 2' is arranged in alignment with the drive shaft but has the driving clutches 4' mounted thereon while the eccentrics 3' are mounted on the intermediate shaft 5'.

A spur gear 17 is loosely mounted on the drive shaft 1 and meshes with a spur pinion 18 on the intermediate shaft 5'. The spur gear 17 is provided with clutch teeth 19 to be engaged by the teeth on the clutch sleeve 20, slidable on the driving shaft and rotatable therewith.

The clutch sleeve 21 slidable and non-rotatably mounted on the driven shaft 2' is provided with clutch teeth at both ends, one set being arranged to engage the clutch sleeve of the eccentrically driven sleeve 22 and the other set being adapted to engage the clutch teeth 23 of the driving shaft.

The arrangement in either instance shown is extremely simple and enables the operator of the device to connect the driven shaft at will to be operated directly from the driving shaft or through the intermediate gearing described.

In the operation of the arrangement of mechanism shown in Figure 1 the eccentrics function through the clutch drive mechanisms on the intermediate shaft and through the gear and pinion operate the driven shaft with a reverse movement when the driven shaft is put into engagement with the pinion and the eccentrics into engagement with the drive shaft and a direct drive in a forward direction is established by shifting the clutch sleeves to disengage the eccentrics and the pinion and to connect the driven shaft direct with the drive shaft.

In the form illustrated in Figure 2 the drive shaft operates the intermediate shaft at a higher speed through the gear and pinion and this movement is transmitted through the eccentric and clutch drive to the driven shaft when the sleeves are in the position for effecting a reverse movement of the driven shaft.

What I claim as my invention is:—

1. In a change speed mechanism, the combination with the driving and driven shafts, of a free wheel driving connection between the driving and driven shafts, an intermediate shaft co-operating in said free wheel drive, a gear wheel fixedly mounted on said intermediate shaft, a gear loosely mounted on one of the aforesaid shafts and constantly in mesh with the aforesaid gear, a pair of clutch sleeves slidably mounted one on the drive shaft and one on the driven shaft, and means for operating said sleeves in unison to selectively connect the driving and driven shafts direct or through the gears and eccentric drive.

2. In a change speed mechanism, the combination with the driving and driven shafts arranged in alignment, of a gear wheel loosely mounted on one of said shafts, a clutch adapted to connect said gear wheel with the shaft on which it is mounted, a gear wheel meshing with the aforesaid gear, an intermediate shaft carrying the latter gear wheel, an eccentric clutch driving mechanism arranged between the intermediate shaft and the shaft not carrying a gear wheel, and a clutch operating with said eccentric gear to connect it to rotate with the shaft on which it is mounted or to connect the aligned shafts directly together and means for operating said clutches in unison.

3. In a change speed mechanism, the combination with a driving and driven shaft arranged in alignment, of a plurality of eccentrics mounted on the driving shaft and free to rotate thereon and having a clutch face, a clutch adapted to connect said eccentrics with said shaft or to free the same and connect the driven shaft therewith, an intermediate shaft having free wheel discs thereon operatively connected with said eccentrics, a gear mounted on said intermediate shaft, a gear meshing with the aforesaid gear and loosely mounted on the driven shaft and having a clutch face, a clutch member slidably connected with the driving shaft and adapted to engage the clutch face on said gear, and means for operating said clutch members in unison.

DIMITRI SENSAUD DE LAVAUD.